May 21, 1968   R. E. SCHROEDER ET AL   3,383,750
METHOD FOR FLANGING OF THERMOSPLASTIC LINED PIPE
Filed April 26, 1965
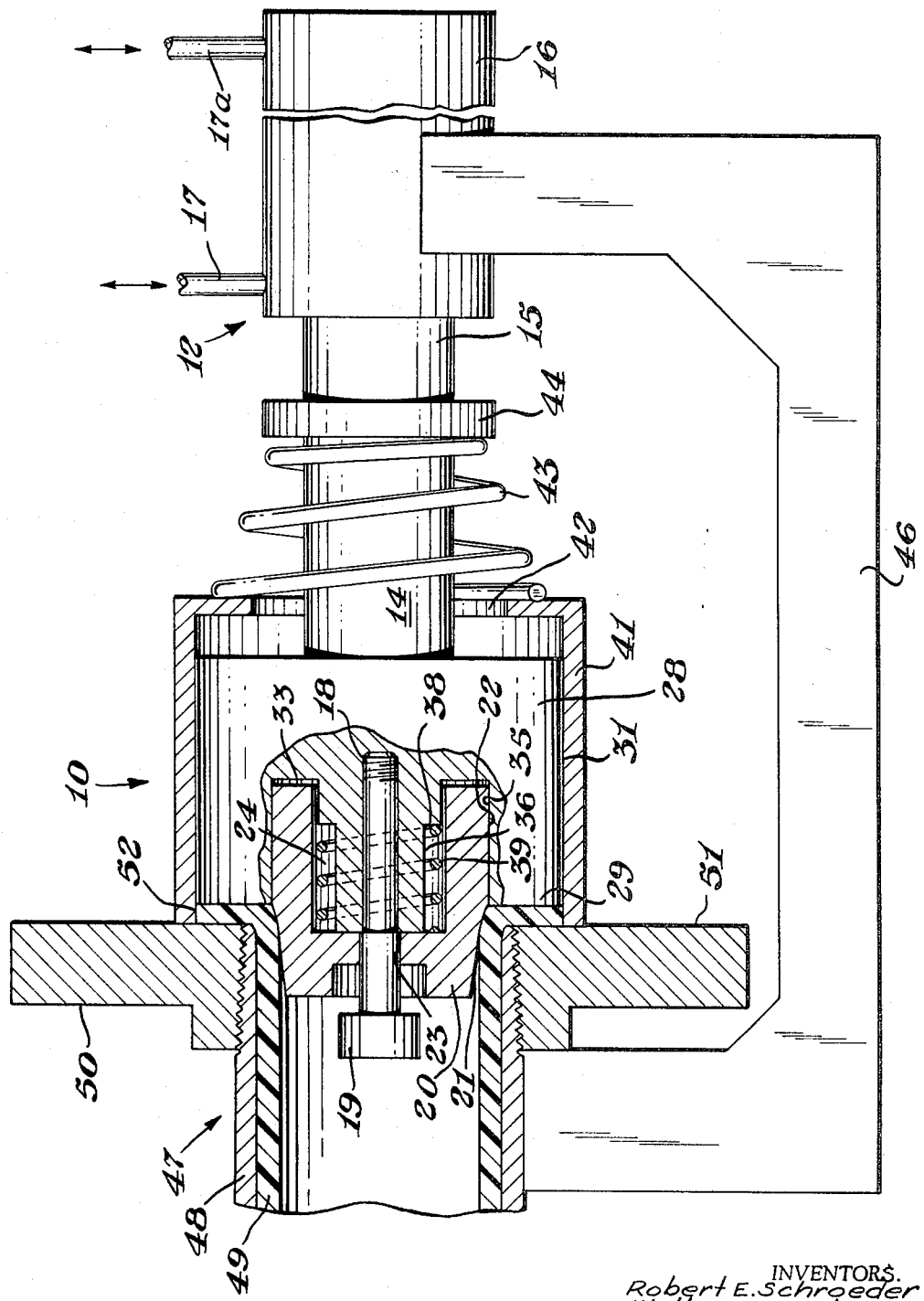
INVENTORS.
Robert E. Schroeder
Walter H. West
William F. Mick
BY Robert R. Ingraham AGENT
ATTORNEY United States Patent Office 3,383,750
Patented May 21, 1968

3,383,750
METHOD FOR FLANGING OF THERMOPLASTIC LINED PIPE
Robert E. Schroeder, Essexville, Walter H. West, Bay City, and William F. Mick, Midland, Mich., assignors to The Dow Chemical Company, Midland, Mich., a corporation of Delaware
Filed Apr. 26, 1965, Ser. No. 450,622
4 Claims. (Cl. 29—157)

ABSTRACT OF THE DISCLOSURE

Field flanging of thermoplastic lined pipe is accomplished using a tapered plug to support a heat softened liner during field flanging. The tapered plug is spring loaded and prevents formation of a ridge during molding of the flange.

---

The invention relates to a method for the formation of flanges on the lining of a pipe having a synthetic resinous thermoplastic liner. It more particularly relates to method suitable for the flanging of the liner of such pipes in the field.

Many varieties of pipe employing thermoplastic resinous liners are employed in operations where chemical resistance of the conduit or pipe is required. In most applications, it is desirable that the contents of the pipe should come in contact only with the liner. In connection lengths of such pipe, it is therefore customary to provide liner-to-liner contact. This has been accomplished in a variety of manners and means. However, in most applications where thermoplastic resinous liners are utilized in a piping system, it is necessary to employ a means of joining the pipe which does not require high temperatures which would destroy or deform the lining material. Therefore, a bolted flange is most often applied, although in certain instances beneficially a union is utilized. Usually when such a piping system is installed, the dimensions of the sections of pipe must be known and the pipe manufacture to a suitable length having appropriately flanged liners and then the prefabricated pipe is shipped to the point of installation.

In preparing the ends of plastic lined pipe, particularly the flanged end, oftentimes the external wall of the pipe is cut and a portion of the plastic lining is left protruding therefrom. The pipe is threaded and a metal flange installed. By heating the protruding portion of the liner, it is possible to mold a flange on the lining which generally corresponds to the metal flange; however, oftentimes in such operations the dimensions of the liner generally adjacent to the flange are altered to result in ridges or other undesirable configurations with the pipe line. A circumferential ridge on the inner surface of the lining oftentimes results in undesired turbulence and oftentimes where a suspension of solids is being conveyed within the pipe undesired abrasion will result from the turbulent flow adjacent the ridge.

It is an object of this invention to provide a new method for the formation of flanges on the lining of a thermoplastic resinous lined pope.

A further object of this invention is to provide a method which permits flanging of the liner of the thermoplastic resinous lined pipe which does not cause restriction of the passage in the pipe adjacent the flange.

A further object of the invention is to provide an improved method for the flanging of the liner of the thermoplastic resinous lined pipe which provides satisfactory flanging when minor variations in the inside diameter of the liner are encountered.

These benefits and other advantages in accordance with the present invention are achieved in a method of flanging the liner of a thermoplastic resinous lined pipe comprising removing a portion of the pipe having a generally cylindrical configuration adjacent at least one end of the pipe to leave a generally unsupported cylindrical portion of the liner extending therefrom, heating the extending portion of the liner until the portion is in a heat plastified condition, supporting the inner wall of the portion of the plastic liner generally adjacent the area to be flanged, and including a portion of the liner which is not heat plastified and forcing the extending portion of the lining into a generally radially outwardly extending configuration while in a heat plastified condition and subsequently cooling the radially extending portion of the liner below the heat plastifying temperature.

The method of the present invention is advantageously practiced by employing an apparatus which comprises in cooperative combination, a ram member having a first end and a second end, a frustoconical plug resiliently and slideably mounted upon the first end of the ram member, means to maintain the plug in a position remote from the second end of the ram, a generally cylindrical mold member rigidly affixed to the ram adjacent the first-end, the mold member defining a cavity adapted to receive the generally frustoconical plug, the mold member having a generally annular mold surface extending generally radially outwardly from the plug, the mold surface being disposed adjacent the first end of the ram and remote from the second end, a hollow sleeve slideably mounted upon the molding body and means to resiliently tension the sleeve toward the first end of the body.

Further features and advantages of the present invention will become more apparent from the following specification when taken in connection with the drawing wherein:

The figure is a schematic representation of a flanging apparatus for the practice of the invention, in engagement with a thermoplastic resinous lined pipe.

In the figure there is schematically illustrated an apparatus generally designated by the reference numeral 10. The apparatus 10 comprises in cooperative combination a ram 12 having a first end 14 and the second end 15. Secured to the second end of 15 is a ram actuating means or cylinder 16 having hydraulic lines 17 and 17a which are in operative communication with the cylinder 16. The first end 14 of the ram body 12 defines an internally threaded aperture 18 which is coaxially arranged with relation to the ram 14. A retaining member or bolt 19 is disposed within the aperture 18 and engages the threads of the aperture. A plug 20 is slidably disposed on the first end 14 of the body 12; the plug 20 defines the frustoconical surface 21 disposed remotely from the second end 15 and a cylindrical surface 22 generally adjacent the second end 15. The frustoconical surface 21 decreases in diameter away from the second end 15. The plug 21 defines a generally axially disposed cavity 23 within which the first end and retainer 19 is free to slide. A second axial internal cavity 24 is defined by the plug 20 and is disposed generally adjacent the first end of the ram 12. A generally cylindrical molding body 28 is rigidly affixed to the first end 14 of the ram 12. The molding body 28 defines an annular molding surface 29 lying in a plane generally normal to the axis of the ram 12. The molding body 28 has a generally cylindrical external surface 31. The molding body 28 defines an internal annular recess 33. The annular recess of the body 28 has an external wall 35 and an internal wall 36. The internal wall 36 forms a generally annular shoulder 38. An axial resilient tensioning means or helical spring 39 is disposed within the common portion of the cavity 24 of the plug 20 and the cavity or recess 33 of the molding body 28. A hollow cylindrical body is slidably disposed about the molding body 28 and is in generally coaxial relationship thereto. The hollow cylindrical body 41 defines an axial aperture 42. A resilient cylindrical tensioning means 43 is in engagement with the hollow cylindrical body 41 and with a collar or stop 44 rigidly affixed to the ram 12. The tensioning means or spring 43 serves to force the cylindrical body 41 away from the second end 15 of the ram 12. A frame 46 is affixed to the cylinder 16 and adapted to engage a work piece such as a flanged thermoplastic resinous lined pipe 47. The thermoplastic resinous lined pipe 47 has an outer non-thermoplastic or metal wall 48 and a thermoplastic resinous lining 49 disposed within the wall 48. The flange 50 is rigidly affixed to the wall 48. The flange 50 has a generally annular surface 51 extending radially outwardly from the pipe. A thermoplastic resinous flange 52 is formed and is contiguous with a portion of the surface 51 of the flange 50.

In practice of the method of the present invention a lined pipe such as the lined pipe 47 is cut to the desired length, an annular metal portion of the pipe is removed to leave an annular portion of the lining, extending unsupported from the pipe which is heated to a temperature sufficiently high to render the resinous lining thermoplastic. The apparatus 10 is forced into the annular portion of the pipe lining. The plug 20 engages the lining by means of the frustoconical surface 21. As the apparatus 10 is forced toward the flange 50 the resilient tensioning means 39 is compressed and the plug seated firmly within the thermoplastic resinous lining. The annular surface 29 of the molding body 28 engages the projecting unsupported portion of the lining. The cylindrical body 41 engages the surface 51 of the flange 50 and the annular surface 29 forces the heat plastified portion of the lining to conform to the cavity defined by the flange 51 of the cylindrical body 41, the surface 29 of the body 28 and the adjacent surface 21 of the plug 20. When the temperature of the heat plastified portion of the liner is below the thermoplastic temperature the apparatus is removed. It is critical in the operation of the present invention that the plug 20 have the frusto-conical surface 21. Without such a surface, minor misalignment of the apparatus with the piece to be shaped results in deformation of the lining and oftentimes scarring thereof. The frustoconical surface permits a reasonable variation inside the diameter of the lining without producing undesired ridges or sticking. As the plug 20 is resiliently positioned within the pipe, wide variations in diameter of the lining are tolerated.

Utilizing an apparatus substantially as illustrated in the figure. Steel pipes having thermoplastic resinous linings of saran, polypropylene and a chlorinated polyether (available under the trade designation of "Penton") respectively, have been provided readily and easily with flanged liners. The thickness of the flange is readily controlled within reasonable limits by varying the length of the liner of the cylindrical portion of the liner extending from the steel pipe. The greater the length of the projecting portion the thicker will be the thermoplastic flange. Generally it is desired to prepare a relatively thin flange particularly in cases where the thermoplastic resinous material employed as the liner exhibits the characteristics of cold flow or creep. Heating of the projecting portion of the liner is readily accompanied employing hot air radiant heat and the like. Occasionally when short lengths of pipe are being prepared the projecting portion of the liner may be heated by immersion into a liquid which does not attack the liner. More often such liquids conveniently are materials such as glycerin, propylene glycol and the like.

The apparatus is illustrated as being hydraulically operated; however, other ram accuating means are readily employed which provide the necessary linear motion of the flange forming assembly toward the pipe. Pneumatic, electrical and even manual operation is conveniently adapted depending upon the requirements of a particular situation.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A method of flanging the liner of a thermoplastic resinous lined pipe comprising,
   removing a portion of the pipe having a generally cylindrical configuration adjacent at least one end of the pipe to leave a generally unsupported cylindrical portion of the liner extending therefrom,
   heating the extending portion of the liner until the portion is in a heat plastified condition, supporting an inner wall of the portion of the plastic liner generally adjacent the area to be flanged and including a portion of the liner which is not heat plastified, the heat plastified liner portion being supported by a generally frustoconical configuration adapted to partially enter the liner, resiliently urging the configuration toward the pipe in an axial direction,
   then forcing the extending heat plastified portion of the liner into a generally radially outwardly extending configuration while in a heat plastified condition and subsequentially cooling the radially extended portion of the liner below the heat plastifying temperature and thereby forming a flange on the liner without forming an internally projecting ridge on the liner.
2. The method of claim 1 including the step of heating the extending portion of the liner by means of a hot gas.
3. The method of claim 1 including the step of securing a non-thermoplastic flange to the pipe adjacent the extended portion of the lining,
   the flange having a generally radially outwardly extending surface,
   the step of deforming the liner to conform to at least the radially extending portion of the surface of the flange.
4. The method of claim 1 wherein the tapered element is a generally frustoconical plug.

References Cited
UNITED STATES PATENTS

| | | | |
|---|---|---|---|
| 3,020,068 | 2/1962 | Costanzo | 29—157 X |
| 3,047,937 | 8/1962 | De Vecchi | 29—512 X |
| 3,142,868 | 8/1964 | Blount. | |
| 3,192,612 | 7/1965 | Elliott et al. | 29—523 X |
| 3,253,841 | 5/1966 | Ahmad. | |
| 3,298,716 | 1/1967 | Taylor et al. | 29—157 X |

FOREIGN PATENTS

| | | |
|---|---|---|
| 141,671 | 6/1951 | Australia. |

CHARLIE T. MOON, *Primary Examiner.*